United States Patent
Lu et al.

(10) Patent No.: US 9,945,416 B2
(45) Date of Patent: Apr. 17, 2018

(54) THREE-SECTIONAL HIDDEN SLIDING RAIL MECHANISM

(71) Applicant: WUXI HAIDAER PRECISION SLIDES CO., LTD, Wuxi, Jiangsu (CN)

(72) Inventors: Binwu Lu, Jiangsu (CN); Xinglong Xu, Jiangsu (CN); Feng Qian, Jiangsu (CN)

(73) Assignee: WUXI HAIDER PRECISION SLIDES CO., LTD, Wuxi, Jiangsu (CN)

( * ) Notice: Subject to any disclaimer, the term of this patent is extended or adjusted under 35 U.S.C. 154(b) by 0 days.

(21) Appl. No.: 15/122,928

(22) PCT Filed: Dec. 30, 2014

(86) PCT No.: PCT/CN2014/095509
§ 371 (c)(1),
(2) Date: Sep. 1, 2016

(87) PCT Pub. No.: WO2015/161666
PCT Pub. Date: Oct. 29, 2015

(65) Prior Publication Data
US 2017/0071338 A1  Mar. 16, 2017

(30) Foreign Application Priority Data

Apr. 25, 2014  (CN) .......................... 2014 1 0170328

(51) Int. Cl.
*A47B 95/00*  (2006.01)
*F16C 29/04*  (2006.01)
(Continued)

(52) U.S. Cl.
CPC ............ *F16C 29/045* (2013.01); *A47B 88/45* (2017.01); *A47B 88/467* (2017.01); *A47B 88/49* (2017.01);
(Continued)

(58) Field of Classification Search
CPC ....... A47B 88/49; A47B 88/467; A47B 88/45; A47B 2210/0035; A47B 2210/007;
(Continued)

(56) References Cited

U.S. PATENT DOCUMENTS 9,016,813 B2 * 4/2015 Moody ................. F25D 25/025
312/331
9,243,662 B2 * 1/2016 Bonat ..................... F16C 29/04
(Continued)

Primary Examiner — Hanh V Tran

(57) ABSTRACT

A three-sectional hidden sliding rail includes a pair of sliding rail sub-mechanisms symmetrically mounted at a left and a right side of a movable object. Each sliding rail sub-mechanism includes a fixed guide rail, a middle rail, and a movable guide rail. The fixed guide rail is mounted on a fixed object. The movable guide rail is mounted on a side surface of the movable object. The fixed guide rail and the movable guide rail (3) have a sliding guide groove. An upper and a lower end of the middle rail are mounted in the sliding guide grooves of the movable guide rail and the fixed guide rail. The middle rail is able to slide along the sliding guide groove of the fixed guide rail (1), and the movable guide rail is able to slide along the middle rail (2). The sliding rail sub-mechanisms are connected through a synchronous mechanism.

5 Claims, 7 Drawing Sheets

(51) Int. Cl.
*A47B 88/467* (2017.01)
*A47B 88/49* (2017.01)
*A47B 88/45* (2017.01)

(52) U.S. Cl.
CPC ...... *F16C 29/046* (2013.01); *A47B 2210/007* (2013.01); *A47B 2210/0035* (2013.01); *A47B 2210/0075* (2013.01); *A47B 2210/0078* (2013.01); *F16C 2314/72* (2013.01)

(58) Field of Classification Search
CPC ..... A47B 2210/0075; A47B 2210/0078; F16C 29/045; F16C 29/046
See application file for complete search history.

(56) References Cited

U.S. PATENT DOCUMENTS

| | | | | |
|---|---|---|---|---|
| 9,730,515 B2* | 8/2017 | Bachor | ............ | A47B 88/57 |
| 2007/0080616 A1* | 4/2007 | Lam | ............ | A47B 88/49 |
| | | | | 312/334.6 |
| 2010/0007256 A1* | 1/2010 | Kim | ............ | A47B 88/483 |
| | | | | 312/408 |
| 2011/0187254 A1* | 8/2011 | Chen | ............ | A47B 88/49 |
| | | | | 312/334.8 |
| 2011/0210655 A1* | 9/2011 | Brown | ............ | A47B 88/40 |
| | | | | 312/334.8 |
| 2012/0091872 A1* | 4/2012 | Matthes | ............ | A47B 88/40 |
| | | | | 312/334.8 |
| 2012/0237144 A1* | 9/2012 | Gasser | ............ | A47B 88/40 |
| | | | | 384/7 |
| 2012/0243810 A1* | 9/2012 | Schwartzmann | ...... | A47B 88/49 |
| | | | | 384/20 |
| 2013/0119843 A1* | 5/2013 | Breisacher | ............ | A47B 88/047 |
| | | | | 312/334.47 |
| 2013/0127319 A1* | 5/2013 | Breisacher | ............ | A47B 88/493 |
| | | | | 312/334.23 |
| 2013/0129266 A1* | 5/2013 | Chen | ............ | A47B 88/40 |
| | | | | 384/20 |
| 2013/0129267 A1* | 5/2013 | Chen | ............ | A47B 88/04 |
| | | | | 384/20 |
| 2013/0249367 A1* | 9/2013 | Chen | ............ | A47B 88/14 |
| | | | | 312/334.8 |
| 2013/0270987 A1* | 10/2013 | Kelly | ............ | A47B 88/483 |
| | | | | 312/331 |
| 2013/0307390 A1* | 11/2013 | Bohle | ............ | E05D 15/463 |
| | | | | 312/294 |
| 2014/0265783 A1* | 9/2014 | Hauer | ............ | A47B 88/12 |
| | | | | 312/331 |

* cited by examiner

THREE-SECTIONAL HIDDEN SLIDING RAIL MECHANISM

CROSS REFERENCE OF RELATED APPLICATION

This is a U.S. National Stage under 35 U.S.C 371 of the International Application PCT/CN2014/095509, filed Dec. 30, 2014, which claims priority under 35 U.S.C. 119(a-d) to CN 201410170328.8, filed Apr. 25, 2014.

BACKGROUND OF THE PRESENT INVENTION

Field of Invention

The present invention relates to a drawer sliding rail technology, and more particularly to a three-sectional hidden sliding rail mechanism.

Description of Related Arts

The conventional drawer sliding rails are generally divided into the open-mounted drawer sliding rails and the hidden drawer sliding rails. The hidden drawer sliding rails are widely applied in the enclosed objects, such as the furniture drawer and the refrigerator drawer. The hidden sliding rails are mainly two-sectional and three-sectional. The conventional three-sectional hidden sliding rails are mainly side-fastened. A pair of the conventional three-sectional hidden sliding rails is symmetrically mounted on two side surfaces of the fixed object and the drawer. The fixed guide rail of the sliding rail is mounted on the outer surface of the fixed object. The movable guide rail of the sliding rail is fixedly arranged on the side surface of the drawer, and the movable guide rail is connected with the fixed guide rail through the middle rail. During the practical application, due to being affected by the gap among the fixed guide rail, the middle rail, and the movable guide rail, the sliding of the sliding rails at the two sides easily becomes asynchronous, causing the user to feel not smooth enough when pushing and pulling the drawer and the sliding rail to be even locked, which accordingly brings great inconvenience to the user.

SUMMARY OF THE PRESENT INVENTION

For above problems, the present invention provides a three-sectional hidden sliding rail, which is able to solve a usage problem influenced by asynchronous sliding rails at two sides of a conventional three-sectional hidden sliding rail during using.

Technical solutions of the present invention are described as follows.

A three-sectional hidden sliding rail mechanism comprises a pair of sliding rail sub-mechanisms which is symmetrically mounted at a left side and a right side of a movable object. Each sliding rail sub-mechanism comprises a fixed guide rail, a middle rail, and a movable guide rail. The fixed guide rail is mounted on a fixed object through a fixed guide rail bracket. The movable guide rail is mounted on a side surface of the movable object through a movable guide rail bracket. Both of the fixed guide rail and the movable guide rail have a horizontally parallel sliding guide groove. An upper end and a lower end of the middle rail are respectively mounted in the sliding guide grooves of the movable guide rail and the fixed guide rail. The middle rail is able to slide along the sliding guide groove of the fixed guide rail, and meanwhile the movable guide rail is able to slide along the middle rail. The sliding rail sub-mechanisms at the left side and the right side of the movable object are connected through a synchronous mechanism. The synchronous mechanism comprises gear rack mechanisms which are respectively mounted on the sliding rail sub-mechanisms at the left side and the right side of the movable object horizontally and in parallel. The gear rack mechanisms on the sliding rail sub-mechanisms at the left side and the right side of the movable object are connected through a connection shaft.

Preferably, each gear rack mechanism comprises a synchronous gear and a rack. The synchronous gear is connected to and mounted on the movable guide rail through a gear bracket. The rack is mounted on the fixed guide rail bracket along a direction of the sliding guide groove of the fixed guide rail. The gear meshes with the rack. The gear bracket comprises a movable guide rail connection part and a gear connection part. The movable guide rail connection part has an "n"-shaped cross section. Clips are arranged on inner walls of two sides of the movable guide rail connection part. Mounting holes are provided on two side surfaces of a sliding back end of the movable guide rail. The clips are stuck in the mounting holes. The gear connection part is connected to an outer wall of a side of the movable guide rail connection part which faces the sliding rail sub-mechanism at a side. The gear connection part is discoid. An axial convex part is arranged on a first side surface of the synchronous gear which faces the sliding rail sub-mechanism at a side. A shaft hole is provided on the axial convex part. The connection shaft is mounted in the shaft hole. A coaxial circular groove is provided on a second side surface of the synchronous gear. Three inverted-hook-shaped convex blocks are circumferentially and evenly arranged in the circular groove. The three inverted-hook-shaped convex blocks hook the discoid gear connection part, so that the synchronous gear is able to rotate around the discoid gear connection part. "C"-shaped drive frames are respectively sleeved in the fixed guide rail and the movable guide rail. Steel ball holes are provided on side walls of two ends of the "C"-shaped drive frames. Steel balls are arranged in the "C"-shaped drive frames, and positions of the steel balls are limited by the steel ball holes. The upper end and the lower end of the middle rail are respectively inserted into the "C"-shaped drive frames and supported by the steel balls. First steel balls, which are mounted in the "C"-shaped drive frame of the fixed guide rail, contact and cooperate with an inner surface of the fixed guide rail through the steel ball holes on the "C"-shaped drive frame. Second steel balls, which are mounted in the "C"-shaped drive frame of the movable guide rail, contact and cooperate with an inner surface of the movable guide rail through the steel ball holes on the "C"-shaped drive frame. The fixed guide rail bracket is "L"-shaped. A vertical bracket of the "L"-shaped fixed guide rail bracket is fixed on the fixed object. The fixed guide rail is connected to a horizontal bracket of the "L"-shaped fixed guide rail bracket through welding. Slots are provided on an end plane of the horizontal bracket of the "L"-shaped fixed guide rail bracket. Clamping holes are provided on the rack at positions corresponding to the slots. The "L"-shaped fixed guide rail bracket and the rack are engaged together through the slots and the clamping holes. A hook and a mounting circular hole are arranged on a top surface of the movable guide rail. The hook hooks the movable guide rail bracket, and the movable guide rail and the movable guide rail bracket are fixedly connected by a rivet through the mounting circular hole. "C"-shaped drive frame limited blocks are arranged at two ends of the inner surface of the fixed guide rail and the movable guide rail and two ends of an upper end plane and a lower end plane of the middle rail.

Beneficial Effects

Compared with the conventional three-sectional hidden sliding rail mechanism, the present invention has following beneficial effects. The sliding rail sub-mechanisms at the left side and the right side of the movable object are connected through the synchronous mechanism. During sliding of the sliding rail sub-mechanisms, the synchronous mechanism guarantees that the sliding rail sub-mechanisms at the two sides of the movable object slide synchronously, so that the movable object is able to slide smoothly during sliding.

DETAILED DESCRIPTION OF THE PREFERRED EMBODIMENT

Figure 1:
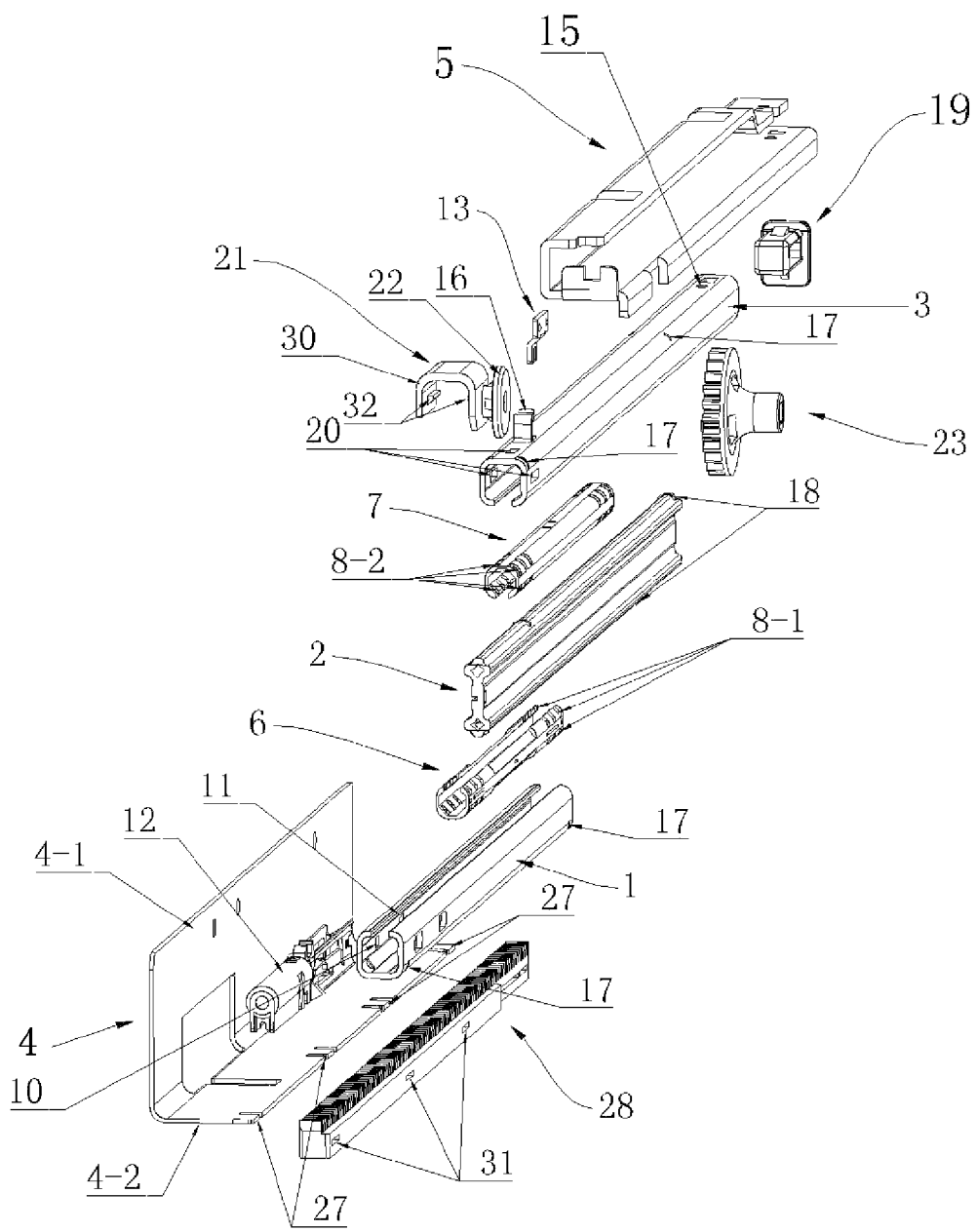
FIG. 1 is an exploded view of a three-sectional hidden sliding rail mechanism according to a preferred embodiment of the present invention.
Figure 2:
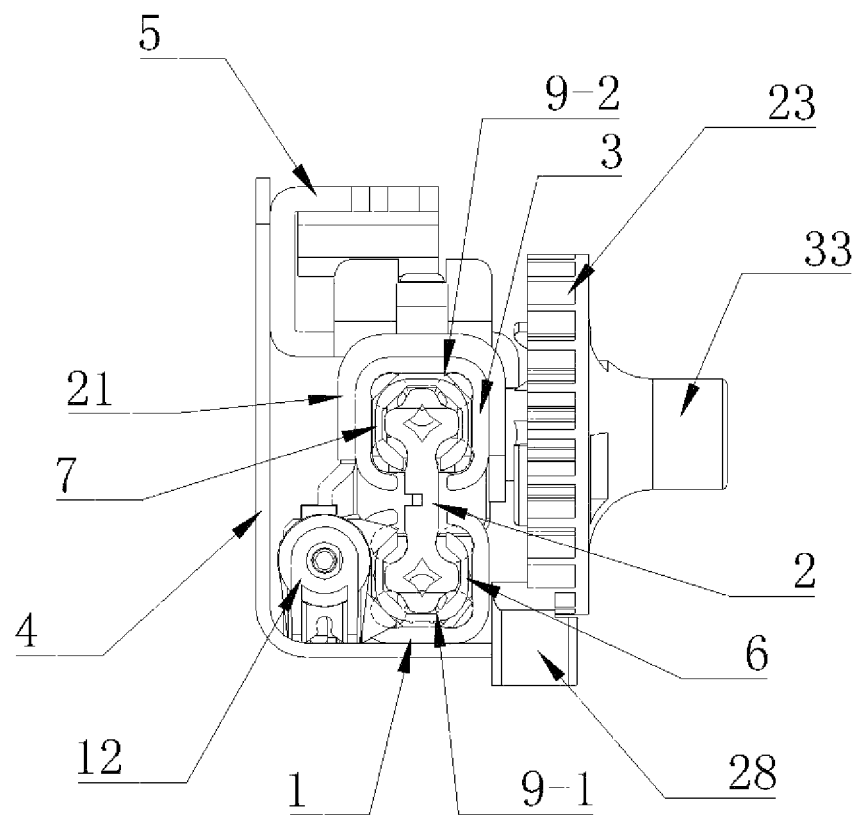
FIG. 2 is a cross sectional view of the three-sectional hidden sliding rail mechanism according to the preferred embodiment of the present invention.
Figure 3:
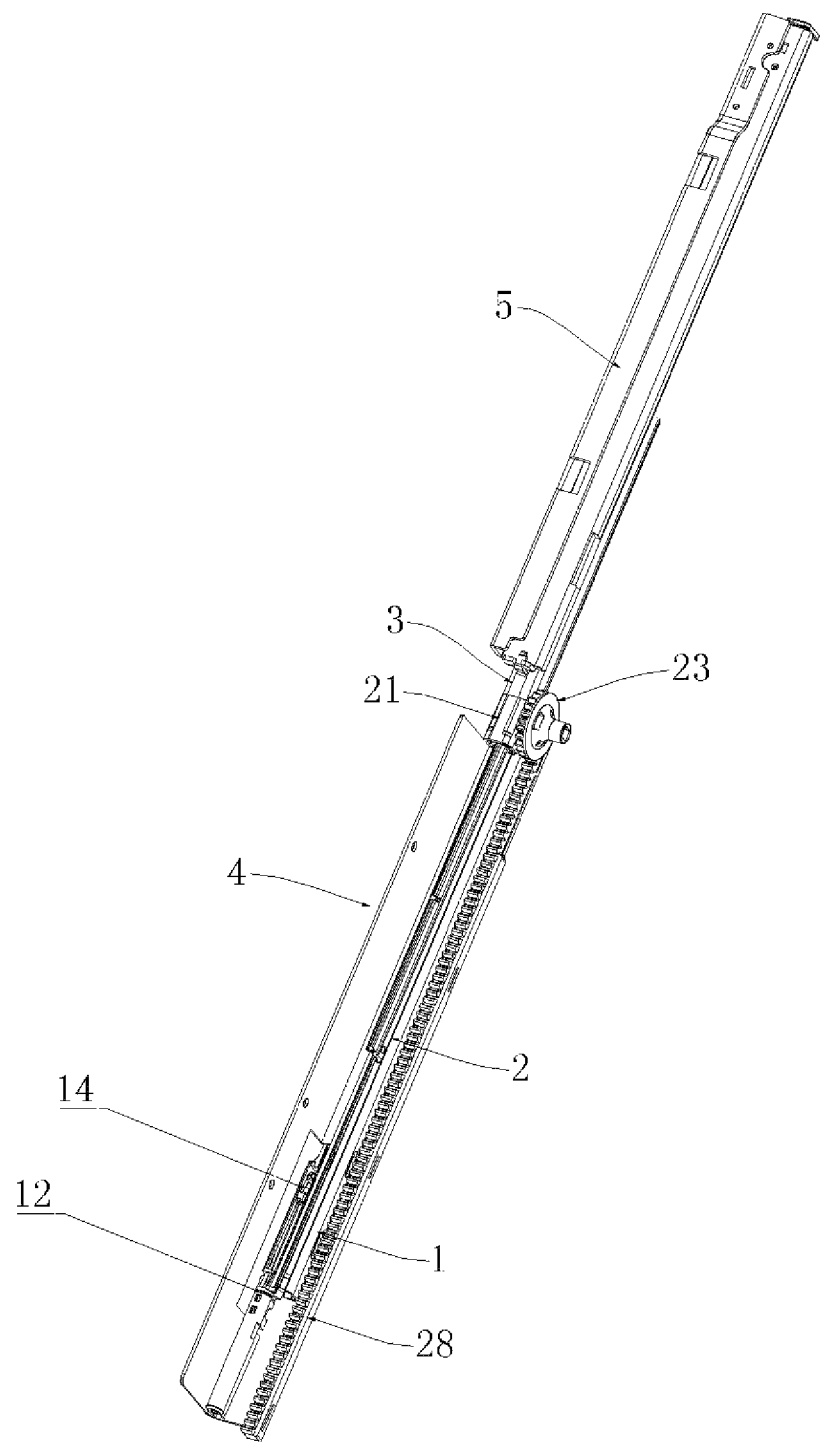
FIG. 3 is a first structural sketch view of the three-sectional hidden sliding rail mechanism when pulled open according to the preferred embodiment of the present invention.
Figure 4:
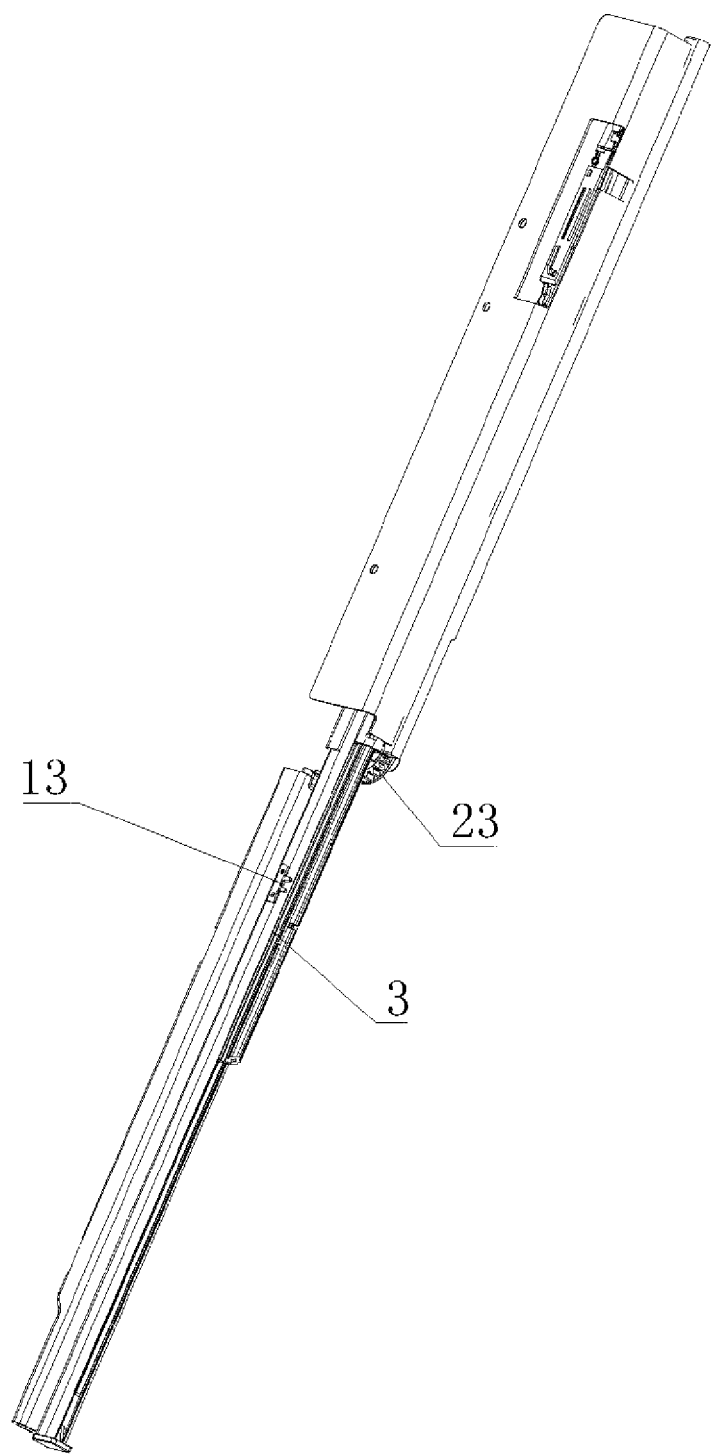
FIG. 4 is a second structural sketch view of the three-sectional hidden sliding rail mechanism when pulled open according to the preferred embodiment of the present invention.
Figure 5:
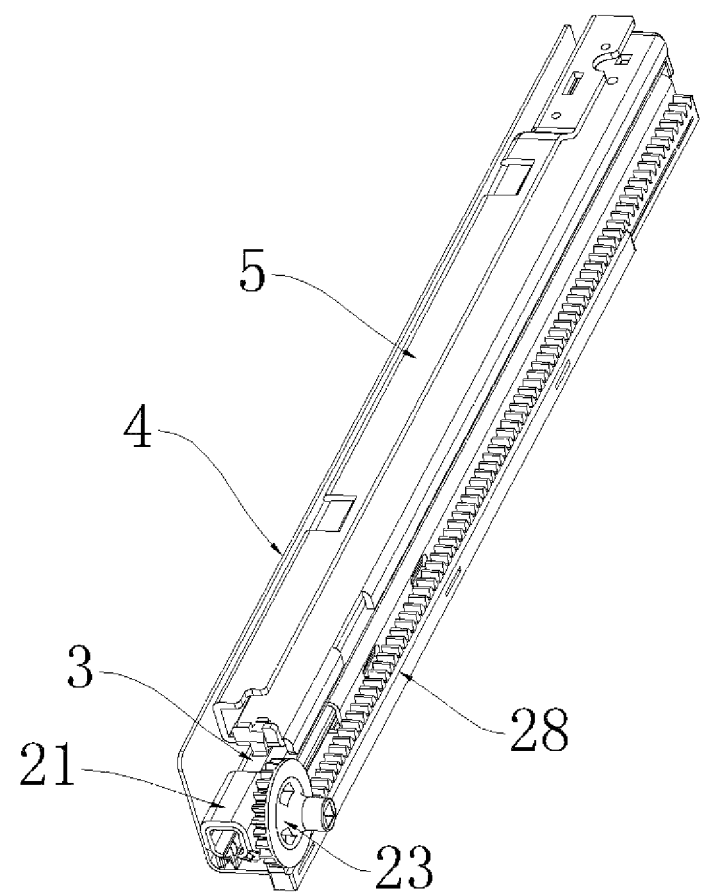
FIG. 5 is a structural sketch view of the three-sectional hidden sliding rail mechanism when closed according to the preferred embodiment of the present invention.
Figure 6:
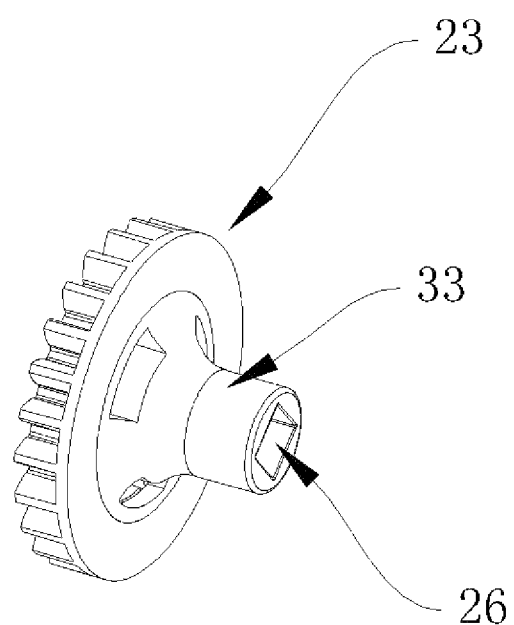
FIG. 6 is a first structural sketch view of a synchronous gear of the three-sectional hidden sliding rail mechanism according to the preferred embodiment of the present invention.
Figure 7:
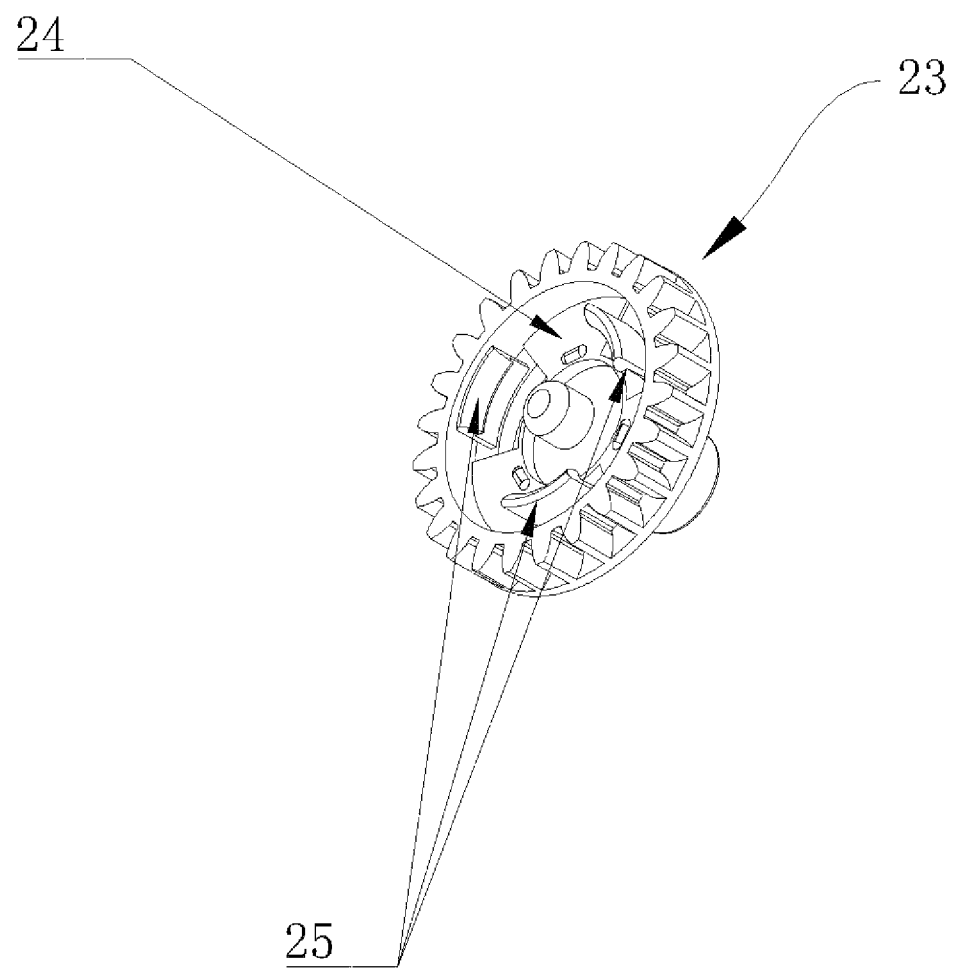
FIG. 7 is a second structural sketch view of the synchronous gear of the three-sectional hidden sliding rail mechanism according to the preferred embodiment of the present invention.

Referring to FIGS. 1-7, according to a preferred embodiment of the present invention, a three-sectional hidden sliding rail mechanism comprises a pair of sliding rail sub-mechanisms which is symmetrically mounted at a left side and a right side of a movable object. Each sliding rail sub-mechanism comprises a fixed guide rail 1, a middle rail 2, and a movable guide rail 3. The fixed guide rail 1 is mounted on a fixed object through a fixed guide rail bracket 4. The movable guide rail 3 is mounted on a side surface of the movable object through a movable guide rail bracket 5. Both of the fixed guide rail 1 and the movable guide rail 3 have a horizontally parallel sliding guide groove. An upper end and a lower end of the middle rail 2 are respectively mounted in the sliding guide grooves of the movable guide rail 3 and the fixed guide rail 1. The middle rail 2 is able to slide along the sliding guide groove of the fixed guide rail 1, and meanwhile the movable guide rail 3 is able to slide along the middle rail 2. The sliding rail sub-mechanisms at the left side and the right side of the movable object are connected through a synchronous mechanism. The synchronous mechanism comprises gear rack mechanisms which are respectively mounted on the sliding rail sub-mechanisms at the left side and the right side of the movable object horizontally and in parallel. The gear rack mechanisms on the sliding rail sub-mechanisms at the left side and the right side of the movable object are connected through a connection shaft 29. The connection shaft 29 is not showed in the drawings.

Each gear rack mechanism comprises a synchronous gear 23 and a rack 28. The synchronous gear 23 is connected to and mounted on the movable guide rail 3 through a gear bracket 21. The rack 28 is mounted on the fixed guide rail bracket 4 along a direction of the sliding guide groove of the fixed guide rail 1. The gear 23 meshes with the rack 28. The gear bracket 21 comprises a movable guide rail connection part 30 and a gear connection part 22. The movable guide rail connection part 30 has an "n"-shaped cross section. Clips 32 are arranged on inner walls of two sides of the movable guide rail connection part 30. Mounting holes 20 are provided on two side surfaces of a sliding back end of the movable guide rail 3. The clips 32 are stuck in the mounting holes 20. The gear connection part 22 is connected to an outer wall of a side of the movable guide rail connection part 30 which faces the sliding rail sub-mechanism at a side. The gear connection part 22 is discoid. An axial convex part 33 is arranged on a first side surface of the synchronous gear 23 which faces the sliding rail sub-mechanism at a side. A shaft hole 26 is provided on the axial convex part 33. The connection shaft 29 is mounted in the shaft hole 26. A coaxial circular groove 24 is provided on a second side surface of the synchronous gear 23. Three inverted-hook-shaped convex blocks 25 are circumferentially and evenly arranged in the circular groove 24. The three inverted-hook-shaped convex blocks 25 hook the discoid gear connection part 22, so that the synchronous gear 23 is able to rotate around the discoid gear connection part 22. "C"-shaped drive frames 6 and 7 are respectively sleeved in the fixed guide rail 1 and the movable guide rail 3. Steel ball holes are provided on side walls of two ends of the "C"-shaped drive frames 6 and 7. Steel balls are respectively arranged in the "C"-shaped drive frames 6 and 7, and positions of the steel balls are limited by the steel ball holes. The upper end and the lower end of the middle rail 2 are respectively inserted into the "C"-shaped drive frames 7 and 6 and supported by the steel balls 9. First steel balls 9-1, which are mounted in the "C"-shaped drive frame 6 of the fixed guide rail 1, contact and cooperate with an inner surface of the fixed guide rail 1 through the steel ball holes 8-1 on the "C"-shaped drive frame 6. Second steel balls 9-2, which are mounted in the "C"-shaped drive frame 7 of the movable guide rail 3, contact and cooperate with an inner surface of the movable guide rail 3 through the steel ball holes 8-2 on the "C"-shaped drive frame 7. The fixed guide rail bracket 4 is "L"-shaped. A vertical bracket 4-1 of the "L"-shaped fixed guide rail bracket 4 is fixed on the fixed object. The fixed guide rail 1 is connected to a horizontal bracket 4-2 of the "L"-shaped fixed guide rail bracket 4 through welding. Slots 27 are provided on an end plane of the horizontal bracket 4-2 of the "L"-shaped fixed guide rail bracket 4. Clamping holes 31 are provided on the rack 28 at positions corresponding to the slots 27. The "L"-shaped fixed guide rail bracket 4 and the rack 28 are engaged together through the slots 27 and the clamping holes 31. A first hook 16 and a mounting circular hole 15 are arranged on a top surface of the movable guide rail 3. The first hook 16 hooks the movable guide rail bracket 5, and the movable guide rail 3 and the movable guide rail bracket 5 are fixedly connected by a rivet through the mounting circular hole 15. First "C"-shaped drive frame limited blocks 17 are arranged at two ends of the inner surface of the fixed guide rail 1 and the movable guide rail 3. Second "C"-shaped drive frame limited blocks 18 are arranged at two ends of an upper end plane and a lower end plane of the middle rail 2. Positions of the "C"-shaped drive frames 6 and 7 are respectively limited by the first "C"-shaped drive frame limited blocks 17 and the second "C"-shaped drive frame limited blocks 18.

In FIG. 1, a sliding rail automatic recovery device 12 is showed, which is connected to the fixed guide rail 1 through a second hook 10 and a square hole 11 on the fixed guide rail 1. An elastic piece 13 is arranged on the movable guide rail 3. When the movable guide rail 3 slides, the elastic piece 13 is able to drive a sliding block 14 on the sliding rail automatic recovery device 12 to move. In FIG. 1, a tail plug 19 is showed, which is mounted on a sliding front end of the movable guide rail 3.

According to the preferred embodiment of the present invention, the fixed guide rails, the middle rails and the movable guide rails show a symmetric rail body stacking structure, so that a weight of the movable object, namely a weight of the drawer including objects on the drawer, is uniformly distributed on the sliding rail, which improves a structure stability of the sliding rail after assembling, effectively avoids the sliding rail being deformed due to long time weight-bearing, enables a transmission of the sliding rail to be more stable and smoother, and increases a service time of the sliding rail.

What is claimed is:

1. A three-sectional hidden sliding rail mechanism, comprising a pair of sliding rail sub-mechanisms which is symmetrically mounted at a left side and a right side of a movable object, wherein: each sliding rail sub-mechanism comprises a fixed guide rail, a middle rail, and a movable guide rail; said fixed guide rail is mounted on a fixed object through a fixed guide rail bracket; said movable guide rail is mounted on a side surface of the movable object through a movable guide rail bracket; both of said fixed guide rail and said movable guide rail have a horizontally parallel sliding guide groove; an upper end and a lower end of said middle rail are respectively mounted in said sliding guide grooves of said movable guide rail and said fixed guide rail; said middle rail is able to slide along said sliding guide groove of said fixed guide rail, and meanwhile said movable guide rail is able to slide along said middle rail; said sliding rail sub-mechanisms at the left side and the right side of the movable object are connected through a synchronous mechanism; said synchronous mechanism comprises gear rack mechanisms which are respectively mounted on said sliding rail sub-mechanisms at the left side and the right side of the movable object horizontally and in parallel; and said gear rack mechanisms on said sliding rail sub-mechanisms at the left side and the right side of the movable object are connected through a connection shaft;

each gear rack mechanism comprises a synchronous gear and a rack; said synchronous gear is connected to and mounted on said movable guide rail through a gear bracket; said rack is mounted on said fixed guide rail bracket along a direction of said sliding guide groove of said fixed guide rail; and said gear meshes with said rack;

said gear bracket comprises a movable guide rail connection part and a gear connection part; said movable guide rail connection part has an "n"-shaped cross section; clips are arranged on inner walls of two sides of said movable guide rail connection part; mounting holes are provided on two side surfaces of a sliding back end of said movable guide rail; said clips are stuck in said mounting holes; said gear connection part is connected to an outer wall of a side of said movable guide rail connection part which faces said sliding rail sub-mechanism at a side; said gear connection part is discoid; an axial convex part is arranged on a first side surface of said synchronous gear which faces said sliding rail sub-mechanism at a side; a shaft hole is provided on said axial convex part; said connection shaft is mounted in said shaft hole; a coaxial circular groove is provided on a second side surface of said synchronous gear; three inverted-hook-shaped convex blocks are circumferentially and evenly arranged in said circular groove; and said three inverted-hook-shaped convex blocks hook said discoid gear connection part, so that said synchronous gear is able to rotate around said discoid gear connection part.

2. The three-sectional hidden sliding rail mechanism, as recited in claim 1, wherein: "C"-shaped drive frames are respectively sleeved in said fixed guide rail and said movable guide rail; steel ball holes are provided on side walls of two ends of said "C"-shaped drive frames; steel balls are arranged in said "C"-shaped drive frames, and positions of said steel balls are limited by said steel ball holes; said upper end and said lower end of said middle rail are respectively inserted into said "C"-shaped drive frames and supported by said steel balls; first steel balls, which are mounted in said "C"-shaped drive frame of said fixed guide rail, contact and cooperate with an inner surface of said fixed guide rail through said steel ball holes on said "C"-shaped drive frame; and second steel balls, which are mounted in said "C"-shaped drive frame of said movable guide rail, contact and cooperate with an inner surface of said movable guide rail through said steel ball holes on said "C"-shaped drive frame.

3. The three-sectional hidden sliding rail mechanism, as recited in claim 2, wherein: said fixed guide rail bracket is "L"-shaped; a vertical bracket of said "L"-shaped fixed guide rail bracket is fixed on the fixed object; said fixed guide rail is connected to a horizontal bracket of said "L"-shaped fixed guide rail bracket through welding; slots are provided on an end plane of said horizontal bracket of said "L"-shaped fixed guide rail bracket; clamping holes are provided on said rack at positions corresponding to said slots; and, said "L"-shaped fixed guide rail bracket and said rack are engaged together through said slots and said clamping holes.

4. The three-sectional hidden sliding rail mechanism, as recited in claim 2, wherein: a hook and a mounting circular hole are arranged on a top surface of said movable guide rail; said hook hooks said movable guide rail bracket; and, said movable guide rail and said movable guide rail bracket are fixedly connected by a rivet through said mounting circular hole.

5. The three-sectional hidden sliding rail mechanism, as recited in claim 2, wherein: "C"-shaped drive frame limited blocks are arranged at two ends of said inner surface of said fixed guide rail and said movable guide rail and two ends of an upper end plane and a lower end plane of said middle rail.

\* \* \* \* \*